O. T. OLSEN.
WAGON DUMPING MECHANISM.
APPLICATION FILED APR. 19, 1919.

1,323,904.

Patented Dec. 2, 1919.

Witnesses
E. R. Ruppert.

Inventor
O. T. Olsen
By Victor J. Evans
Attorney

UNITED STATES PATENT OFFICE.

OSCAR T. OLSEN, OF ROLFE, IOWA.

WAGON-DUMPING MECHANISM.

1,323,904.

Specification of Letters Patent.

Patented Dec. 2, 1919.

Application filed April 19, 1919. Serial No. 291,244.

*To all whom it may concern:*

Be it known that I, OSCAR T. OLSEN, a citizen of the United States, residing at Rolfe, in the county of Pocahontas and State of Iowa, have invented new and useful Improvements in Wagon-Dumping Mechanism, of which the following is a specification.

My invention comprehends the improvements in lifting mechanism for the body of dumping wagons, wherein a vertical screw is employed and arranged between the driver's cab or seat and the adjacent end of the wagon body.

It frequently happens that the great lateral strain placed upon the screw by the weight of a loaded wagon body while being elevated, results in the bending or breaking of the screw, thus putting the owner to considerable expense and inconvenience while the mechanism is being repaired.

It is therefore the object of this invention to provide a frame for the hoisting screw, which not only constitutes a bearing for the upper end of the screw, but coöperates with a plurality of reinforcing bars to afford the screw maximum strength and rigidity under all conditions; the frame and said bars being mounted to swing as a unit with the screw as the wagon body is elevated.

The nature and advantages of the invention will be readily apparent when the following detailed description is read in connection with the accompanying drawings, the invention residing in the construction, combination and arrangement of parts as claimed.

In the drawing forming part of this specification like numerals of reference indicate similar parts in the several views, and wherein:—

Figure 1:
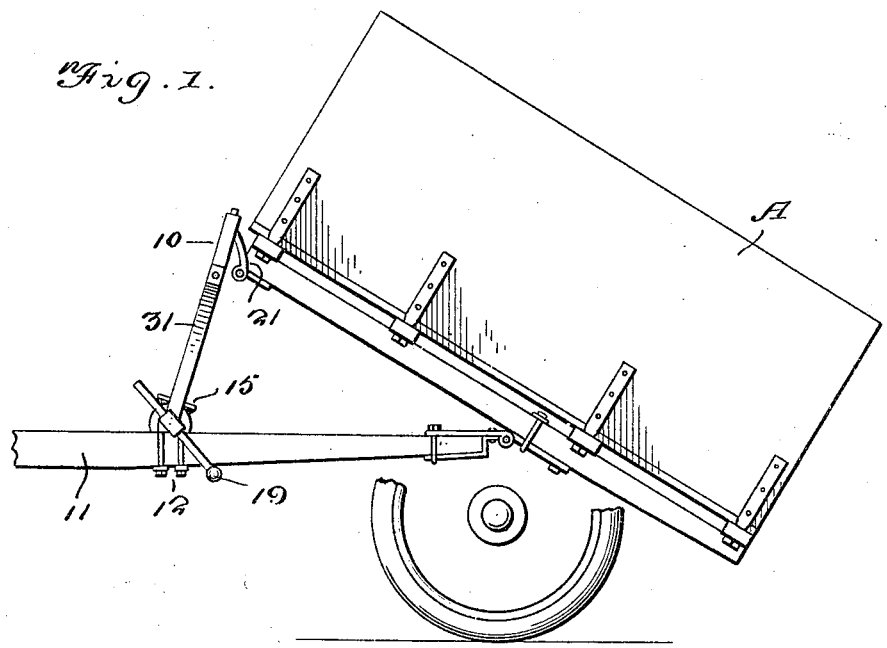
Figure 1 is a side elevation showing a wagon body partly elevated by means of my invention.
Figure 2:
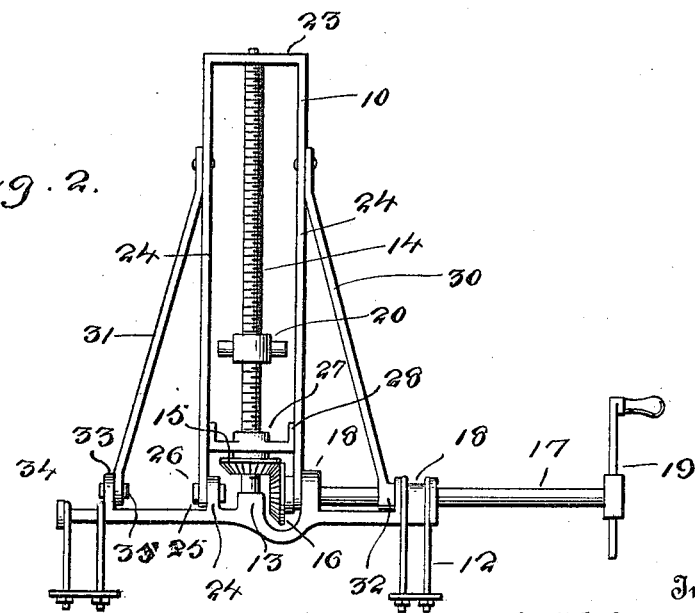
Fig. 2 is an enlarged view of the lifting mechanism.

The mechanism employed for the purpose above mentioned, includes a frame 10 adapted to be arranged transversely of the chassis of a motor vehicle, resting upon the opposed side members 11 thereof. Associated with the opposite ends of the frame 10 are clamps of any suitable construction, indicated generally at 12 for securing the frame 10 upon the chassis of the machine. The frame 10 is provided with a central bearing 13 for the lower end of a vertically disposed screw 14 adapted to be rotated by means of a bevel gear 15 carried by the screw and meshing with a similar gear 16 mounted upon the adjacent end of an operating shaft 17. The shaft 17 is of course disposed at a right angle to the screw, and operates in bearings 18 provided by the frame 10. A crank handle 19 having detachable association with the operating shaft 17, is utilized for rotating the latter. The wagon body engaging element includes a nut 20 threadedly associated with the screw 13 to travel longitudinally thereof when the screw is rotated, a pair of bracket arms 21 being carried by the nut 20 and designed to be secured to the bottom and adjacent end walls of the wagon body A to be lifted. In practice, when it is desired to elevate the body A with a view of emptying the contents, the shaft 17 is rotated to impart a similar movement to the screw 14 through the instrumentality of the bevel gearing. As the screw 14 is rotated, the nut 20 travels longitudinally of the screw and the body A tilted.

As the body A is elevated, the screw 14 assumes an inclined position with respect to the frame 10, and is consequently subjected to severe lateral strain under the weight of the loaded wagon body. It frequently happens that under such conditions the screw 14 is bent or broken, and in order to obviate these difficulties, I make use of an inverted substantially U-shaped frame which straddles the screw 13 as shown, the cross piece 23 of the frame constituting a bearing for the adjacent end of the screw 14. The parallel limbs 24 of the frame are provided with openings adjacent their free ends, the opening of one of the limbs loosely receiving the operating shaft 17, and having its free end arranged between the beveled gear 16 and one of the bearings 18 for the shaft. The opening in the other limb of the frame registers with an opening in a lug 24 rising from the frame 10, and passed through said opening is a pivot bolt 25 having a nut 26 associated therewith to hold the parts operatively connected. A plate 27 is arranged transversely between the limbs 23 of the frame and has its opposite ends bent upwardly as at 28 and secured to the limbs of the frame in any suitable manner. The plate 27 has a central opening for the reception of the screw 14 and constitutes a bearing for the latter. Reinforcing bars 30 and 31 respectively have their corresponding upper extremities secured in any suitable manner to the limbs of the frame, the bars being divergently disposed and have their opposite ends pivotally mounted to swing with the frame and the screw 14 as a unit to an inclined position when the body A is elevated. For this purpose, the bar 30 has its lower extremity formed to provide a collar 32 loosely embracing the operating shaft 17 and disposed in juxtaposition to the outermost bearing 18 for the shaft. Rising from the frame 10 is an apertured lug 33 disposed in face to face contact with the adjacent extremity of the bar 31, the latter being provided with openings for the reception of a pivot bolt 34 which is also passed through the lug 33. A nut 35 is associated with the bolt to hold the parts operatively associated. Manifestly, the inverted U-shaped frame not only constitutes a bearing for the upper extremity of the screw 14, but together with the reinforcing bars 30 and 31 respectively, substantially reinforces the screw 13 affording the latter maximum strength and rigidity under all conditions to withstand the lateral strain to which it is subjected under the weight of a loaded wagon body.

While I have shown and described what I consider the preferred embodiment of my invention, I desire to have it understood that I do not limit myself to the exact construction disclosed, inasmuch as such changes may be resorted to when desired as fall within the scope of what is claimed.

What I claim is:—

1. A wagon body tilting mechanism including a member arranged transversely of the frame of the wagon, spaced bearings projecting from said member, spaced apertured lugs extended from said member, a screw vertically disposed and capable of swinging movement, a wagon body engaging element threadedly associated with said screw, means for rotating the screw including a shaft journaled in said bearings, and inverted U-shaped frame straddling the screw to strengthen the latter against lateral strain, the cross piece of said frame constituting a bearing for the upper end of the screw, the free terminals of said frame being pivotally associated with one of said bearings and the adjacent apertured lug, one terminal of the frame being associated with the shaft, divergently disposed reinforcing bars having their corresponding upper extremities secured to the opposite sides of the frame, and the opposite ends of the reinforcing bars being pivotally associated with the remaining bearing and the remaining lug, one of said bars, being associated with said shaft.

2. A wagon body tilting mechanism including means for associating the mechanism with the frame of a vehicle, a screw vertically disposed and capable of swinging movement, a wagon body engaging element threadedly associated with said screw, means for rotating the screw whereby said body is elevated, an inverted substantially U-shaped frame straddling the screw to strengthen the latter against lateral strain, the cross piece of said frame constituting a bearing for the upper end of the screw, divergently disposed reinforcing bars having their corresponding upper extremities secured to the opposite sides of the frame, and the opposite ends of the reinforcing bars together with said frame being pivotally mounted to move with said screw as a unit to an inclined position when the body is elevated.

In testimony whereof I affix my signature.

OSCAR T. OLSEN.